United States Patent
Beigel et al.

(10) Patent No.: US 6,249,212 B1
(45) Date of Patent: Jun. 19, 2001

(54) UNIVERSAL ELECTRONIC IDENTIFICATION TAG

(75) Inventors: Michael L. Beigel, Corona; Robert E. Malm, Pacific Palisades, both of CA (US)

(73) Assignee: Avid Marketing, Inc., Norco, CA (US)

( * ) Notice: Subject to any disclaimer, the term of this patent is extended or adjusted under 35 U.S.C. 154(b) by 0 days.

(21) Appl. No.: 08/318,235

(22) Filed: Oct. 5, 1994

(51) Int. Cl.$^7$ .................................................. G01S 13/80
(52) U.S. Cl. ........................ 340/10.34; 340/10.34; 340/10.41
(58) Field of Search ...................... 342/42, 44, 51; 340/825.54, 825.31, 825, 870.31, 941, 572, 636, 825.63; 235/439

(56) References Cited

U.S. PATENT DOCUMENTS

| | | | |
|---|---|---|---|
| 4,345,253 | * 8/1982 | Hoover | 342/44 |
| 4,660,027 | * 4/1987 | Davis | 340/636 |
| 4,724,427 | 2/1988 | Carroll | 340/572 |
| 4,752,776 | 6/1988 | Katzenstein | 340/825.54 |
| 5,053,774 | * 10/1991 | Schuermann et al. | 342/44 |
| 5,073,781 | * 12/1991 | Stickelbrocks | 342/51 |
| 5,095,309 | 3/1992 | Troyk et al. | 340/825.54 |
| 5,103,222 | 4/1992 | Hogen Esch et al. | 340/825.54 |
| 5,153,583 | * 10/1992 | Murdoch | 340/825.54 |
| 5,166,676 | * 11/1992 | Milheiser | 340/825.54 |
| 5,214,409 | * 5/1993 | Beigel | 340/825.54 |
| 5,257,011 | * 10/1993 | Beigel | 340/825.54 |
| 5,345,231 | * 9/1994 | Koo et al. | 340/825.63 |
| 5,410,315 | * 4/1995 | Huber | 342/42 |
| 5,499,017 | * 3/1996 | Beigel | 340/825.54 X |
| 5,500,651 | * 3/1996 | Schuermann | 342/42 |
| 5,515,053 | * 5/1996 | Hecht et al. | 342/42 |
| 5,517,188 | * 5/1996 | Carroll et al. | 340/825.54 |
| 5,519,381 | * 5/1996 | Marsh et al. | 340/825.54 X |

FOREIGN PATENT DOCUMENTS

| | | | |
|---|---|---|---|
| 650891 | * 2/1992 | (AU) | 340/825.54 |
| 585132 | * 3/1994 | (EP) | 340/825.54 |
| 596521 | * 5/1994 | (EP) | 340/825.54 |
| 615136 | * 9/1994 | (EP) | 340/825.54 |
| 2259227 | * 3/1993 | (GB) | 340/825.54 |

* cited by examiner

Primary Examiner—Michael Horabik
(74) Attorney, Agent, or Firm—Robert E. Malm

(57) ABSTRACT

The universal electronic identification tag is for use with a variety of readers of different designs including a control reader which can be used to control the operations of the universal tag. A reader interrogates a tag by transmitting a carrier. The universal tag comprises a transducer, a modulator connected across the transducer, and a control means. The control means causes the modulator to drive the transducer with a plurality of different message waveforms after interrogation by a reader, the tag identity being embedded in each of the message waveforms. The message waveforms can be transmitted either simultaneously, sequentially, or both ways. A message waveform is comprised of a sequence of contiguous waveform segments, each waveform segment representing the value of an N-bit group, N being an integer. A waveform segment is a periodic signal characterized by the parameters frequency, phase, and amplitude. The waveform segments which represent the values of an N-bit group are differentiated by the values of at least one parameter.

40 Claims, 3 Drawing Sheets

UNIVERSAL ELECTRONIC IDENTIFICATION TAG

BACKGROUND OF INVENTION

This invention relates generally to electronic identification systems which provide the means for the cooperative identification of objects by means of tags attached to or imbedded in the objects. More specifically, the invention relates to identification tags which can cooperate with a variety of types of tag readers.

A key element of an electronic identification system is a means for communication between reader and tag and, since a tag usually has no independent source of power, a means of transferring power from reader to tag in a sufficient amount to permit the tag to perform its functions. These two functions can both be accomplished with electromagnetically-coupled readers and tags, the predominant technology presently in use. The reader establishes an alternating magnetic field in the vicinity of a tag and the tag extracts both information and power from the magnetic field. The efficient extraction of information and power from an alternating magnetic field mandates the use of a resonant circuit of some sort by the tag.

The first close-coupled electronic identification systems, i.e. reader and tag in close proximity when communicating, consisted of readers which transmitted unmodulated carriers and tags which responded with signals that carried data. System capabilities have been extended in recent years with readers that use modulated carriers to transmit data to tags.

The carrier frequencies used by electronic identification systems of the close-coupled variety have ranged from 100 kHz to 2 GHz in the past. Recent efforts at standardization point to a frequency in the 110 to 135 kHz range as being appropriate for worldwide use.

The most significant difference in present-day close-coupled systems is whether the reader is or is not transmitting the carrier when the tag responds with data. Systems in which the reader transmits during the tag response are called "full-duplex" (FDX). Systems in which the reader is silent during the tag response are called "half duplex" (HDX). In an HDX system the reader transmission periods are interlaced with the tag response periods so as to minimize the energy storage requirements in the tag.

A tag transmits data to a reader by modulating a carrier. The frequency of the tag's carrier can be the same as or different from the frequency of the reader's carrier. When the frequencies of the reader's carrier and the tag's carrier are the same, it may seem in some tag designs that the tag is not using a carrier. Instead, the tag is simply modulating the reader's carrier by absorbing more or less energy as a function of time from the alternating magnetic field established by the reader. A better understanding of the communication principles can be had, however, if the details of tag design are ignored in favor of the more general view that the tag creates a modulated carrier with a frequency the same as or different from the frequency of the reader's carrier. The tag's carrier produces a separate alternating magnetic field which is superimposed on the alternating magnetic field established by the reader.

There are a variety of ways in which the reader and tag can modulate their respective carriers with data. One can start with amplitude shift keying (ASK), phase shift keying (PSK), and frequency shift keying (FSK), the names of which indicate the carrier parameter that is modulated. These modulation types are typically used in binary versions wherein the parameter can take on either one of two values. It may become desirable in the future to use n-level forms of these modulation types in order to realize certain communication efficiencies.

The next level of modulation complexity is to combine these basic types of modulation in a variety of ways as, for example, PSK/FSK wherein both the phase and the frequency of a carrier carries data.

A different way of combining modulation types is to piggy-back one modulation type on another as, for example, when a subcarrier is frequency shift keyed in accordance with the bits in a message, and then the carrier is amplitude modulated by the FSKed subcarrier.

The communications between reader and tag are in the form of messages consisting of a finite number of bits. Each message bit is usually translated into one or more transmit bits prior to modulating a carrier. The typical translations include (besides the identity translation where the message bits are also the transmit bits):

Manchester—0 translates into 01; 1 translates into 10;

Miller—$T(N,1)=T(N-1,2)$ EX.OR [Mbar(N-1) AND Mbar(N)]

$T(N,2)=T(N,1)$ EX.OR $M(N)$ where $M(N)$ is the N'th message bit, $Mbar(N)$ is $M(N)$ inverted, and $T(N,1)$, $T(N,2)$ are the first and second transmit bits associated with the N'th message bit.

Electronic identification systems which utilize implantable or attachable tags have proliferated over the past decade to the point where users are seriously inconvenienced by the incompatible equipments produced by vendors who participate in this market. In general, tags supplied by one vendor cannot be read by the readers supplied by another vendor which means that users necessarily find themselves locked into the systems of one manufacturer. For large-scale applications of electronic identification to occur, some means for assuring equipment compatibility is essential.

There are a number of avenues that can be followed in achieving equipment compatibility. The typical approach to achieving interoperability of equipments is the establishment of standards for this purpose. The establishment of standards has the disadvantage of tending to freeze technology and hinder the development of more advanced systems.

Another approach is to make available "universal" tag readers which can read the tags that are presently being used, and which can be economically upgraded to reading tags that are developed in the future.

A third approach is to make available "universal" tags which can be read by any reader that is presently being used, and which can be upgraded for use with readers of different designs that appear in the future.

BRIEF SUMMARY OF INVENTION

The universal electronic identification tag is for use with a variety of readers of different designs including a control reader which can be used to control the operations of the universal tag. A reader interrogates a tag by transmitting a carrier.

The universal tag comprises a transducer, a modulator connected across the transducer, and a control means. The control means causes the modulator to drive the transducer with a plurality of different message waveforms after interrogation and while the carrier is present and also after interrogation and while the carrier is absent, the tag identity being embedded in each of the message waveforms.

The presence of a carrier is determined by an alerting device which generates an alerting signal having a first value when a reader carrier is less than a predetermined magnitude and a second value when the reader carrier is greater than a predetermined magnitude. The control means causes the modulator to drive the transducer with a plurality of different message waveforms after the value of the alerting signal changes from the first value to the second value, the tag identity being embedded in each of the message waveforms. The control means also causes the modulator to drive the transducer with one or more different message waveforms when the value of the alerting signal changes from the second value to the first value, again with the tag identity being embedded in each of the message waveforms.

A message waveform is comprised of a sequence of contiguous waveform segments, each waveform segment representing the value of an N-bit group, N being an integer. The waveform segments used to represent the values of an N-bit group in at least one message waveform are different from those used to represent an N-bit group in the other message waveforms.

A waveform segment is a periodic signal characterized by the parameters frequency, phase, and amplitude. The waveform segments which represent the values of an N-bit group are differentiated by the values of at least one parameter.

The control means causes the modulator to drive the transducer either simultaneously, sequentially, or simultaneously and sequentially with a plurality of message waveforms.

The modulator comprises a plurality of driving circuits connected across the transducer. The control means causes the modulator to drive the transducer with one or more message waveforms using one of the driving circuits after interrogation by a reader. At least one of the driving circuits includes a resistive load across the transducer, the magnitude of the resistive load being determined by the message waveform. Another of the driving circuits injects charge into the transducer, the magnitude of the injected charge being determined by the message waveform. Still another of the driving circuits includes a reactive load across the transducer, the magnitude of the reactive load being determined by the message waveform.

At least one of the driving circuits includes a first load and a second load connected in series across the transducer, the first load being short-circuited for one polarity of the voltage across the transducer, the second load being short-circuited for the other polarity. The control means can be programmed so that only one of the loads is driven by a message waveform. Other programming options provide for the first and second loads to be driven in phase or out of phase.

At least one of the driving circuits includes a first charge injector and a second charge injector connected in series across the transducer, the first charge injector being short-circuited for one polarity of the voltage across the transducer, the second charge injector being short-circuited for the other polarity of the voltage across the transducer. Here also, the control means can be programmed so that only one of the charge injectors is driven, the two charge injectors are driven in phase, or the two charge injectors are driven out of phase.

Since the universal tag must operate with readers which transmit carriers with different frequencies, the control means is programmed to set the resonant frequency of the transducer to the frequency of the carrier being transmitted by a reader.

A two-stage power developer connected across the transducer supplies power to the components comprising the tag, the power developer obtaining power from the voltage induced in the transducer by a reader's carrier, a first portion of the power supplied by the reader's carrier being supplied by the power developer directly to the tag components, a second portion of the power supplied by the reader's carrier being stored by the power developer and supplied to the tag components when the first portion is insufficient to power the tag.

The power developer includes a voltage regulator for powering voltage-sensitive elements of the tag.

An alternative power developer utilizes a battery for supplying power to the components comprising a tag. The power developer recharges the battery with power from the voltage induced in the transducer by a reader's carrier.

A clock generator connected across the transducer supplies clock signals to the components comprising the tag. The clock generator includes an oscillator locked to the frequency of the voltage induced in the transducer by a reader's carrier. The clock generator includes a frequency memory which causes the frequency of the oscillator to be maintained at the frequency of the voltage induced in the transducer after the induced voltage disappears.

A digital-to-analog converter, which converts a number supplied by the control means to a voltage, supplies voltages to tag units which require voltages other than those provided by the power developer.

A demodulator connected across the transducer determines whether the voltage appearing across the transducer is unmodulated or modulated with data and supplies the control means with a modulation indicator. If the voltage is modulated, the demodulator extracts and supplies the data to the control means.

The control means executes any commands contained in the extracted data. For example, the control means causes the modulator to drive the transducer with a predetermined one or more of the plurality of message waveforms if the transducer voltage is unmodulated. If, however, the transducer voltage is modulated and the proper command is contained in the extracted data, the control means causes the modulator to drive the transducer with one or more of the plurality of message waveforms specified by the extracted data.

The universal tag includes an EEPROM and an EEPROM programmer. The control means, in response to a command contained in the extracted data, modifies its behavior by causing the EEPROM programmer to replace data contained in the EEPROM with data contained in the extracted data.

The control means appends an auxiliary message waveform to the message waveform intended for the control reader, when the control means causes the modulator to drive the transducer with one or more message waveforms after an interrogation by a reader. The auxiliary message waveform is derived from an auxiliary message constructed by the control means.

A sensor circuit having an output which is an uncalibrated measure of an environmental parameter can be incorporated in the universal tag. A memory for storing sensor circuit calibration data is also provided. The control means constructs the auxiliary message intended for the control reader from the sensor output and the sensor circuit calibration data stored in the memory.

The sensor circuit comprises a sensor having an output which is an analog measure of an environmental parameter and an analog-to-digital converter which converts the sensor output to a digital number. One version of the analog-to-digital converter comprises an oscillator having a frequency determined by the magnitude of the sensor output and a counter which counts the number of cycles of the oscillator output signal in a predetermined period of time, the cycle count being a measure of the frequency of the oscillator and the magnitude of the environmental parameter.

The control means utilizes the auxiliary message communication capability to send status data to the control reader. The control means accumulates status data and stores the data in the memory. The control means constructs the auxiliary message from the status data stored in the memory.

DESCRIPTION OF THE PREFERRED EMBODIMENT

The universal electronic identification tag is designed to operate with a variety of readers of differing designs. It achieves this capability by emulating the tags associated with this variety of readers.

The function performed by every tag is to respond with a message waveform when the tag detects the presence of a reader carrier, the message waveform being derived from a message consisting of a finite number of bits stored in the tag. The process of generating a message waveform for transmission from a message may involve a number of steps. Typically, the message bits are translated into transmit bits. Each transmit bit selects one of two possible waveform segments for transmission. The selected waveform segments are concatenated and constitute the tag's message waveform.

In general, tags of different designs would transmit different messages to identify the same object. The reason for the differences in the messages is the use of different message synchronizing schemes, different error-control algorithms, and different encryption techniques and the inclusion of additional data of various kinds. To successfully emulate a tag, the universal tag 1 must respond to an interrogation with the exact message that the emulated tag would use if it were being attached to the same object.

The universal tag emulates a conventional tag by storing the transmit bits that would be associated with the conventional tag if the conventional tag were being used to tag the universal tag's object. In addition, the universal tag stores data that characterizes the waveform segments that the conventional tag uses in assembling its message waveform for transmission. By storing such data for each conventional tag of interest, the universal tag is able to respond to a reader's carrier by transmitting the message waveforms of all of the conventional tags of interest.

Figure 1:
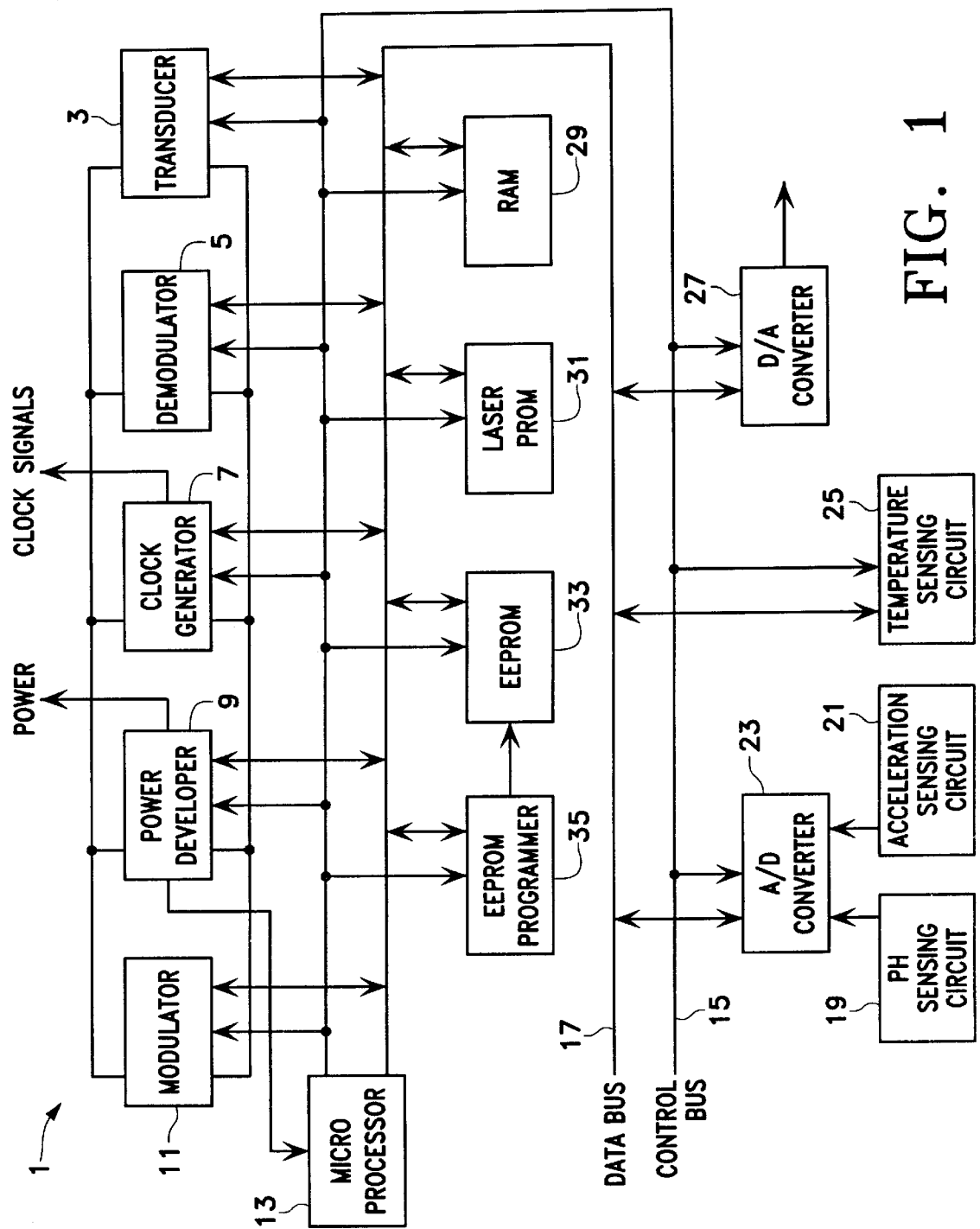
FIG. 1 is a block diagram of the preferred embodiment of the universal electronic identification tag.

A block diagram of the preferred embodiment of the universal tag 1 is shown in FIG. 1. The transducer 3 is the means for coupling the tag to a reader. If the coupling mechanism is an alternating magnetic field, the transducer is a coil and a capacitor connected in parallel. If the coupling mechanism is electromagnetic radiation, the transducer is an antenna. If the coupling mechanism is infrared or visible radiation, the transducer is a combination of an infrared or visible light detector and an infrared or visible light emitter. If the coupling mechanism is wave propagation in elastic media, the transducer in a device which converts electrical signals into corresponding deformations in the elastic media such as to generate propagating waves.

The transducer 3, in many cases, is a resonant device which must be tuned electrically to achieve maximum power transfer between reader and tag. The tunability is accomplished by using voltage-controlled capacitors or by switching in or out discrete values of capacitance or inductance.

The demodulator 5 is connected across the transducer 3 and performs two functions. First, it determines whether a received reader carrier is modulated or not. Second, if the carrier is modulated and the source of the carrier is a control reader (i.e. a reader which can exercise control over the universal tag), the demodulator 5 extracts the data modulated on the carrier. As part of the demodulation process, the demodulator 5 extracts a bit-timing signal from the received modulated carrier. The clock signals produced by the clock generator are synchronized to the bit-timing signal when it is available.

The clock generator 7 is connected across the transducer 3 and utilizes the received carrier in generating all of the clock frequencies required in the tag. The clock generator 7 includes a voltage-controlled oscillator which is phase-locked to the received carrier. The voltage-controlled oscillator includes a memory whereby the oscillator maintains its phase-locked frequency if the carrier disappears. This capability is necessary in emulating an HDX tag where the reader carrier is periodically turned on and off. The clock frequencies which are generated by the clock generator 7 are specified by data stored in memory. If frequencies different from those stored in memory are required to emulate new tags, they may be added to those stored in memory by the control reader.

The clock generator 7 also continually measures the frequency of the reader's carrier by counting cycles for a predetermined period of time. The frequency of the reader carrier is used to tune the transducer 3. The measured value of the carrier frequency is maintained by the clock generator 7 in a register.

The power developer 9 is connected across the transducer 3 and is the source of power for the tag. The power developer 9 may be simply a battery. If the battery is rechargeable, the power developer 9 also includes circuitry which recharges the battery with power that is available from the transducer 3 when the reader is transmitting a carrier.

The power developer 9 can also be without a battery in which case a portion of the power available from the transducer 3 is used to power the tag when the tag signals are being transmitted at the same time that the reader is transmitting its carrier. Another portion of the power available from the transducer 3 when a reader is transmitting is stored and used to power the tag when the reader is not transmitting its carrier.

The modulator 11 is connected across the transducer 3 and generates the message waveforms which are transmitted to a reader in response to a reader's transmission of its carrier.

The microprocessor 13 controls the operations of all units of the tag 1 by means of commands placed on the control bus 15 and transmits data to and receives data from the units by means of the data bus 17.

PH sensor circuit 19 and acceleration sensor circuit 21 produce analog outputs. The analog-to-digital (A/D) converter 23 makes digital representations of the analog sensor circuit outputs available to the microprocessor via the data bus 17.

Temperature sensor circuit 25 produces a digital value for temperature and interfaces directly with the data bus 17.

The digital-to-analog (D/A) converter 27 generates an analog voltage in response to a command and data from the microprocessor 13 for use either in the tag or in a nearby device. For example, a precise voltage is required to power the temperature-sensing element of the temperature sensor circuit 25. Reasonably precise voltages are also required by the EEPROM programmer 35 in programming the EEPROM 33. Specific voltages are also required in implementing the modulator 11.

Temporary storage of sensor circuit outputs is provided in RAM 29. Permanent storage for data which need never be altered is provided in laser PROM 31 wherein a bit is stored by vaporizing or not vaporizing a fuse with a laser beam. Data which the user may wish to change during the life of the tag is stored in EEPROM 33. The means for changing the data in EEPROM 33 is provided by EEPROM programmer 35.

Figure 2:
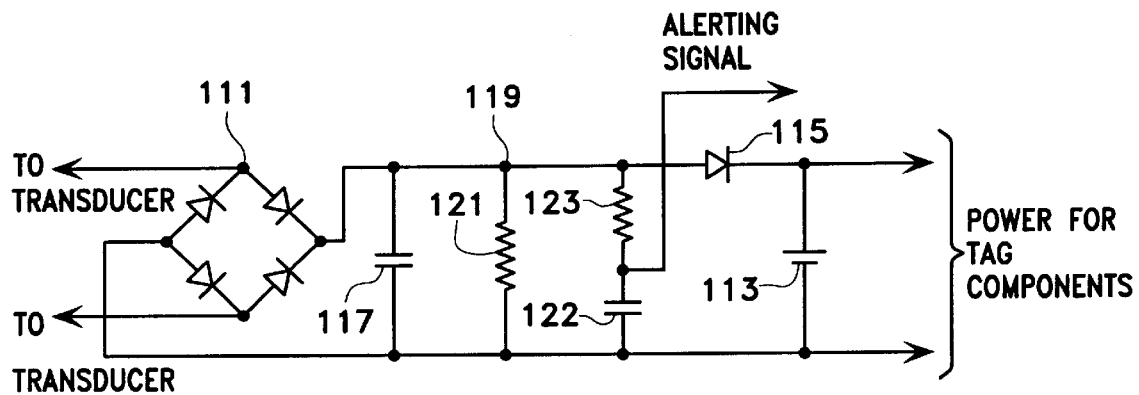
FIG. 2 is a schematic drawing of the preferred embodiment of the universal tag power developer utilizing a rechargeable battery.

The power developer 9 is shown in more detail in FIG. 2. The AC voltage appearing across the transducer 3 as a result of a reader transmitting a carrier is converted into a DC voltage by the full-wave rectifier 111 and recharges the battery 113 through diode 115. The battery 113 is the source of power for all of the tag components. The capacitor 117 reduces the harmonic level in the voltage appearing at point 119. The resistor 121 serves to discharge the capacitor 117 when the reader's carrier is no longer being transmitted. The diode 115 prevents the battery 113 from discharging through the circuitry connected to point 119 when the reader stops transmitting its carrier.

The charging of the capacitor 122 through the resistor 123 as the capacitor 117 charges up produces an alerting signal which, when it reaches a threshold level, initializes the microprocessor 13 and enables the microprocessor to begin executing its stored program. The values of the capacitor 122 and the resistor 123 are chosen such that the alerting signal reaches the threshold level at the same time that the voltage at point 119 reaches the level needed to reliably operate the tag electronics. When the reader stops transmitting its carrier, the capacitor 122 discharges through resistors 121 and 123 and the alerting signal drops below the threshold level thereby signaling the microprocessor that the transmission of the carrier has ceased.

Figure 3:
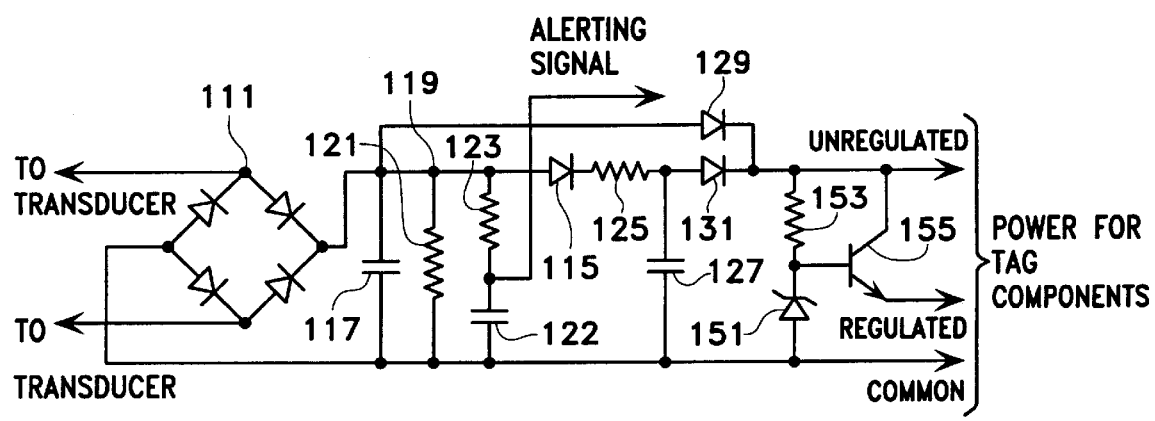
FIG. 3 is a schematic drawing of an alternative embodiment of the universal tag power developer which includes a voltage regulator but which does not employ a battery.

The power developer 9 can also be implemented without a battery as shown in FIG. 3. The battery 113 in FIG. 2 is replaced by the resistor 125 and the capacitor 127 in FIG. 3. Power available at point 119 through diode 129 powers the tag while a carrier is present. Power available from capacitor 127 through diode 131 powers the tag when an HDX reader is not transmitting its carrier. The capacitance of the capacitor 127 is made large enough to support the power demands of the tag during those periods of time that an HDX reader is not transmitting a carrier. The diodes 129 and 131 prevent charge from flowing between capacitors 117 and 127.

A voltage regulator consisting of the Zener diode 151, the resistor 153, and the n-p-n bipolar transistor 155 provides a regulated voltage for the clock generator 7, the sensors 19, 21, and 25, the A/D converter 23, and the D/A converter 27.

Figure 4:
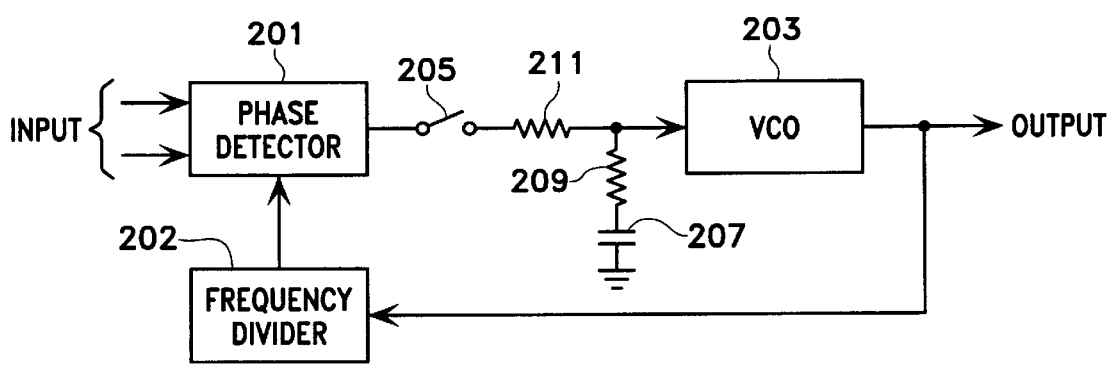
FIG. 4 is a schematic/block drawing of the preferred embodiment of the universal tag clock generator.

The master clock signal, which is divided down to obtain the various clock frequencies required by the tag, is generated as shown in FIG. 4. The phase detector 201 accepts inputs from the transducer 3 and the frequency divider 202 and produces a higher or lower output voltage depending on whether the frequency divider 202 signal is more than or less than 90 degrees out of phase with the transducer 3 signal. The frequency divider 202 divides the output signal from the voltage-controlled oscillator (VCO) 203 by an integer.

When the alerting signal generated in the power developer 9 exceeds a threshold level, the microprocessor 13 closes switch 205 which causes capacitor 207 to charge to a voltage through resistors 209 and 211 such that the signal out of the frequency divider 202 has the same frequency as the transducer 3 signal and is 90 degrees out of phase with respect to the transducer 3 signal. Thus, the frequency of the VCO 203 is locked to an integer multiple of the frequency of the transducer 3 signal.

When the alerting signal generated in the power developer 9 drops below the threshold level, the microprocessor 13 opens the switch 205 which causes the capacitor 207 to maintain the voltage it had just prior to opening the switch 205 and causes the VCO 203 to maintain its frequency at a constant value until the switch 205 closes again.

Figure 5:
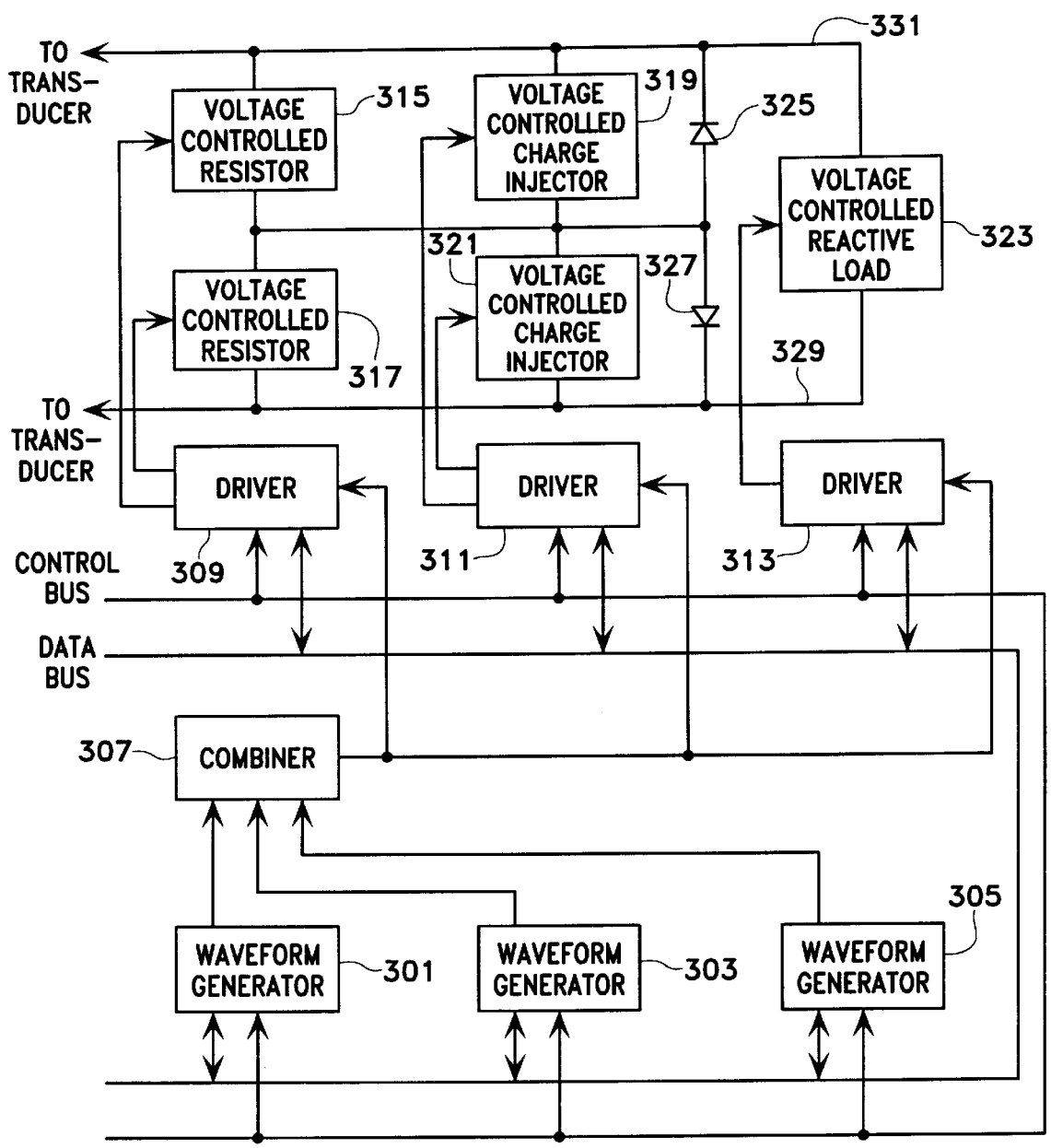
FIG. 5 is a block diagram of the preferred embodiment of the universal tag modulator.

The modulator 11 is shown in greater detail in FIG. 5. After initialization by the first alerting signal, the microprocessor 13 supplies control data stored in EEPROM 33 to each of the three waveform generators 301, 303, and 305.

In the case of binary modulation schemes, the data for each waveform generator defines two waveform segments, one that is associated with the transmission of a "0" and another that is associated with the transmission of a "1".

For example, the transmission of an FSK signal originating in waveform generator 301 would be specified by the microprocessor 13 commanding waveform generator 301 to select the three clock signals with frequencies f(A), f(B), and f(C) from those available from clock generator 7, the clock signal with frequency f(A) being associated with the transmission of a "0", the clock signal with frequency f(B) being associated with the transmission of a "1", and the clock signal with frequency f(C) being the bit-timing clock signal.

The waveform generator 301, when enabled by the microprocessor 13, outputs to the combiner 307 the clock signal with frequency f(A) or f(B) when the microprocessor commands a "0" or "1" respectively to be transmitted. The commanded clock signal is maintained at the output for a bit period as specified by the clock signal with frequency f(C).

The transmission of a PSK signal originating in waveform generator 301 would be specified by the microprocessor 13 commanding waveform generator 301 to select the two clock signals with frequencies f(D) and f(E) from those available from clock generator 7, the clock signal with frequency f(D) and 0-degrees phase being associated with the transmission of a "0", the clock signal with frequency f(D) and 180-degrees phase being associated with the transmission of a "1", and the clock signal with frequency f(E) being the bit-timing clock signal.

The waveform generator 301, when enabled by the microprocessor 13, outputs to the combiner 307 the clock signal with frequency f(D) with 0- or 180-degrees phase when the microprocessor commands a "0" or "1" respectively to be transmitted. The commanded clock signal is maintained at the output for a bit period as specified by the clock signal with frequency f(E).

The transmission of an ASK signal originating in waveform generator 301 would be specified by the microprocessor 13 commanding waveform generator 301 to select the two clock signals with frequencies f(F) and f(G) from those available from clock generator 7, the clock signal with frequency f(F) and scaled to amplitude A(A) being associated with the transmission of a "0", the clock signal with frequency f(F) and scaled to amplitude A(B) being associated with the transmission of a "1", and the clock signal with frequency f(G) being the bit-timing clock signal.

The waveform generator 301, when enabled by the microprocessor 13, outputs to the combiner 307 the clock signal with frequency f(F) and amplitude A(A) or A(B) when the microprocessor commands a "0" or "1" respectively to be transmitted. The commanded clock signal is maintained at the output for a bit period as specified by the clock signal with frequency f(G).

In the case of quaternary modulation schemes, the data for each waveform generator defines four waveform segments, each waveform segment being associated with one of the bit combinations "00", "01", "10", and "11".

For example, the transmission of a four-level FSK signal originating in waveform generator 301 would be specified by the microprocessor 13 commanding waveform generator 301 to select the five clock signals with frequencies f(A), f(B), f(C), f(D), and f(E) from those available from clock generator 7, the clock signal with frequency f(A) being associated with the transmission of a "00" pair, the clock signal with frequency f(B) being associated with the transmission of a "01" pair, the clock signal with frequency f(C) being associated with the transmission of a "10" pair, the clock signal with frequency f(D) being associated with the transmission of a "11" pair, and the clock signal with frequency f(E) being the bit-pair-timing clock signal.

The waveform generator 301, when enabled by the microprocessor 13, outputs to the combiner 307 the clock signal with frequency f(A), f(B), f(C), or f(D) when the microprocessor commands a "00", "01", "10", or "11" respectively to be transmitted. The commanded clock signal is maintained at the output for a bit-pair period as specified by the clock signal with frequency f(E).

The transmission of a four-level PSK signal originating in waveform generator 301 would be specified by the microprocessor 13 commanding waveform generator 301 to select the two clock signals with frequencies f(F) and f(G) from those available from clock generator 7, the clock signals with frequency f(F) and 0-degrees, 90-degrees, 180-degrees, and 270-degrees phase being associated with the transmission of a "00", "01", "10", or "11" respectively, and the clock signal with frequency f(G) being the bit-pair-timing clock signal.

The waveform generator 301, when enabled by the microprocessor 13, outputs to the combiner 307 the clock signal with frequency f(F) with 0-, 90-, 180-, or 270-degrees phase when the microprocessor commands a "00", "01", "10", or "11" respectively to be transmitted. The commanded clock signal is maintained at the output for a bit-pair period as specified by the clock signal with frequency f(G).

The transmission of an ASK signal originating in waveform generator 301 would be specified by the microprocessor 13 commanding waveform generator 301 to select the two clock signals with frequencies f(H) and f(J) from those available from clock generator 7, the clock signals with frequency f(H) and with scaled amplitudes A(A), A(B), A(C), and A(D) being associated with the transmissions of a "00", "01", "10", and "11" respectively, and the clock signal with frequency f(J) being the bit-pair-timing clock signal.

The waveform generator 301, when enabled by the microprocessor 13, outputs to the combiner 307 the clock signal with frequency f(H) with amplitudes A(A), A(B), A(C), or A(D) when the microprocessor commands a "00", "01", "10", or "11" respectively to be transmitted. The commanded clock signal is maintained at the output for a bit-pair period as specified by the clock signal with frequency f(J).

Waveform segments based on quaternary mixed-modulation schemes can also be generated by the waveform generators 301, 303, and 305.

For example, the transmission of a four-level FSK/PSK signal originating in waveform generator 301 would be specified by the microprocessor 13 commanding waveform generator 301 to select the three clock signals with frequencies f(A), f(B), and f(C) from those available from clock generator 7, the clock signal with frequency f(A) and phases 0 and 180 degrees being associated with the transmission of a "00" and "01" bit pair respectively, the clock signal with frequency f(B) and phases 0 and 180 degrees being associated with the transmission of a "10" and "11" bit pair respectively, and the clock signal with frequency f(C) being the bit-pair-timing clock signal.

The waveform generator 301, when enabled by the microprocessor 13, outputs to the combiner 307 the clock signal with frequency f(A) or f(B) and with phases 0 or 180 degrees when the microprocessor commands a "00", "01", "10", or "11" respectively to be transmitted. The commanded clock signal is maintained at the output for a bit-pair period as specified by the clock signal with frequency f(C).

The transmission of a four-level FSK/ASK signal originating in waveform generator 301 would be specified by the microprocessor 13 commanding waveform generator 301 to select the three clock signals with frequencies f(D), f(E), and f(F) from those available from clock generator 7, the clock signal with frequency f(D) and amplitudes A(A) and A(B) being associated with the transmission of a "00" and "01" bit pair respectively, the clock signal with frequency f(E) and amplitudes A(A) and A(B) being associated with the transmission of a "10" and "11" bit pair respectively, and the clock signal with frequency f(F) being the bit-pair-timing clock signal.

The waveform generator 301, when enabled by the microprocessor 13, outputs to the combiner 307 the clock signal with frequency f(D) or f(E) and with amplitudes A(A) or A(B) when the microprocessor commands a "00", "01", "10", or "11" respectively to be transmitted. The commanded clock signal is maintained at the output for a bit-pair period as specified by the clock signal with frequency f(F).

The transmission of a four-level PSK/ASK signal originating in waveform generator 301 would be specified by the microprocessor 13 commanding waveform generator 301 to select the two clock signals with frequencies f(G) and f(H) from those available from clock generator 7, the clock signal with frequency f(G), phase 0 degrees, and amplitudes A(A) and A(B) being associated with the transmission of a "00" and "01" bit pair respectively, the clock signal with frequency f(G), phase 180 degrees, and amplitudes A(A) and A(B) being associated with the transmission of a "10" and "11" bit pair respectively, and the clock signal with frequency f(H) being the bit-pair-timing clock signal.

The waveform generator 301, when enabled by the microprocessor 13, outputs to the combiner 307 the clock signal with frequency f(G) with phases 0 and 180 degrees and with amplitudes A(A) or A(B) when the microprocessor commands a "00", "01", "10", or "11" respectively to be transmitted. The commanded clock signal is maintained at the output for a bit-pair period as specified by the clock signal with frequency f(H).

Up to three different waveform segments can be generated simultaneously by the waveform generators 301, 303, and 305. If fewer than three different waveform segments are required at one time, the microprocessor 13 only enables the waveform generators that are needed.

The sequence of transmit bits corresponding to the message associated with a waveform segment group are transmitted one by one or pair by pair by the microprocessor commanding the appropriate waveform generator 301, 303, or 305 to generate the appropriate waveform segment during each bit period. The sequence of waveform segments that are tied together into a message waveform represent a complete message (i.e. synchronization bits, data bits, error control bits, etc.).

The microprocessor 13 can be programmed to cause the waveform generators 301, 303, and 305 to generate their message waveforms simultaneously or in sequence. In either case, the combiner 307 adds the outputs of the three waveform generators together and outputs the result to the three drivers 309, 311, and 313. The driver 309 conditions the combiner 307 output to drive the voltage-controlled resistors 315 and 317 which can be realized by field-effect transistors. The driver 311 conditions the combiner 307 output to drive the voltage-controlled charge injectors 319 and 321 which can be realized by bipolar transistors. And the driver 313 conditions the combiner 307 output to drive the voltage-controlled reactive load 323. A voltage-controlled capacitive load can be realized by a voltage-controlled capacitor or by a bank of capacitors which can be connected together in arbitrary combinations by switches. The inductance of an inductive load can be realized by a coil with a ferrite core or by a bank of inductors which can be connected together in arbitrary combinations by switches.

The diodes 325 and 327 are placed across the transducer so that the voltage-controlled resistor 315 and the voltage-controlled charge injector 319 are short-circuited when the transducer line 329 is high with respect to transducer line 331. Similarly, the voltage-controlled resistor 317 and the voltage-controlled charge injector 321 are short-circuited when the transducer line 331 is high with respect to transducer line 329.

The voltage-controlled resistors 315 and 317 are used to emulate FDX tags by loading the transducer 3 in accordance with the driver 309 message waveforms. The transducer 3 thereby creates a message signal that is superimposed on the signal being received by the transducer 3 and which can be detected by the FDX reader.

The voltage-controlled resistors 315 and 317 can be driven either in or out of phase. In-phase driving causes the resistances of both voltage-controlled resistors to increase and decrease in synchronism with the driving signal. Out-of-phase driving causes one voltage-controlled resistor to increase and the other to decrease as the driving signal increases and vice versa. The microprocessor 13 selects the desired mode of operation by commands issued to the drivers 309, 311, and 313.

It may be desirable in some situations to set the resistance of one of the voltage-controlled resistors at a high value and to accomplish the variable loading of the transducer only with the other voltage-controlled resistor.

The voltage-controlled charge injectors 319 and 321 are used to emulate HDX tags by injecting current into the transducer 3 in accordance with the driver 309 message waveforms. The transducer 3 thereby emulates the message signal transmitted by an HDX tag.

The voltage-controlled charge injectors 319 and 321 can be driven either in or out of phase in the same manner as the voltage-controlled resistors 315 and 317. It may also be desirable in the case of the voltage-controlled charge injectors to turn one of the voltage-controlled charge injectors off in some situations and accomplish the charge injection only with the other voltage-controlled charge injector.

The voltage-controlled reactive load 323 provides a way of emulating an FDX tag by varying the resonant frequency of the transducer.

The occurrence of a first alerting signal initializes the microprocessor 13 whereupon the microprocessor 13 initializes the clock generator 7 and inquires of the demodulator as to whether the voltage appearing across the transducer 3 is modulated. If the transducer signal is unmodulated, the microprocessor executes an emulation program stored in the EEPROM 33. The microprocessor causes each waveform generator 301, 303, and 305 to select the clock signals from those supplied by the clock generator 7 having specified frequencies, phases, and amplitudes. Thus, each waveform generator is made ready to emulate a particular FDX tag by generating the message waveform associated with the particular FDX tag.

The microprocessor loads each of the waveform generators with the transmit bits for the message associated with the FDX tag that the waveform generator will be emulating. The microprocessor also sets up the drivers 309, 311, and 313 so that the voltage-controlled devices 315, 317, 319, 321, and 323 will be driven in a manner characteristic of the FDX tags being emulated. The microprocessor then issues a start command to the waveform generators, and each waveform generator generates a message waveform with the bit periods timed in accordance with the bit-timing signal specified for each waveform generator.

The resulting signals are added together in the combiner 307, and the combined signal drives the voltage-controlled devices 315, 317, 319, 321, and 323 through the drivers 309, 311, and 313. Thus, in this embodiment, as many as three emulated message signals can be transmitted simultaneously. The reader extracts the data from the emulated message signal that it is designed to receive.

The message signals are transmitted by the tag at least twice so that the reader can extract all of the data in a message even though it misses a portion of the first message signal transmitted.

The process described above for emulating FDX tag message signals is executed for HDX tag message signals when the microprocessor 13 receives the second alerting signal. The FDX tag emulation is aborted if it has not been completed when the second alerting signal occurs.

The tag emulation process can be programmed to take place sequentially rather than simultaneously as described above. In the sequential process, the microprocessor 13 would start waveform generator 301. The waveform generator 301 would generate the message waveform at least twice and then signal the microprocessor that it had completed its message generation function. The microprocessor would then repeat this process with waveform generators 303 and 305. The microprocessor 13 could optionally repeat the overall sequential transmission for as long as the reader carrier was present.

The control reader can change the tag emulation process by replacing the tag emulation program stored in EEPROM 33. The control reader does this by modulating its carrier with an EEPROM reprogram command together with the tag emulation program. The demodulator 5 recognizes the modulated carrier, extracts the data, and alerts the microprocessor 13. The microprocessor then causes the EEPROM programmer 35 to reprogram the EEPROM with the new data.

Figure 6:
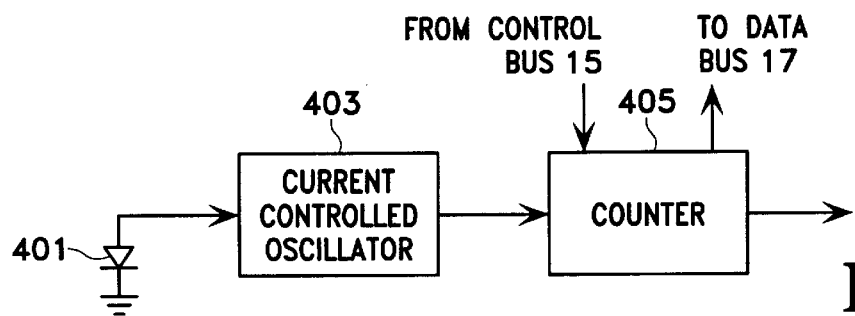
FIG. 6 is a block diagram of the preferred embodiment of a temperature sensor for use in a universal tag.

The temperature sensor 25 is shown in more detail in FIG. 6. The current flowing through the large-area diode 401 is a measure of temperature. The current flows into the multivibrator circuit 403 which oscillates at a frequency monotonically related to the input current. The square-wave output of the multivibrator circuit 403 feeds into a counter 405 which counts the cycles for a predetermined period of time thereby obtaining a digital measure of the frequency of the multivibrator and the temperature of the diode. The counter 405 is cleared and immediately starts counting when a symmetric square-wave clock signal from the clock generator 7 rises and stops counting when the clock signal falls.

The microprocessor 13 may read the contents of the counter whenever the clock signal is low. The microprocessor 13 can be programmed to either read the counter only once or read the counter a number of times and average the results.

The sensors 19, 21, and 25 on different tags located in the same environment will in general provide different measured values for the environmental parameters. For each sensor, one or more calibration constants which define a calibration equation that relates the measured parameter value to the true value is stored in the EEPROM 33.

The microprocessor 13 can send data to the control reader by appending an auxiliary data message to the tag identification message which is intended for the control reader. The auxiliary data message includes its own error-control bits and may also be separately encrypted. The auxiliary data message may also be transformed into a message waveform based on waveform segments that are different from those that form the basis of the tag identification message waveform.

The auxiliary data can be either status data or sensor data. Status data is the data concerning operations in the tag that is available to the microprocessor 13. For example, the microprocessor can keep track of the number of times the tag is interrogated by a reader and could communicate this data to the control reader as auxiliary data. The microprocessor can also monitor the operations of the tag components and inform the control reader of malfunctions by way of the auxiliary data communication channel.

Sensor data can either be incorporated in the auxiliary data message as measured data together with the associated calibration constants or as true data, the true data being obtained by the microprocessor solving the calibration equations for the true values of the environmental parameters.

The calibration constants are preferably measured at the time a tag is manufactured and stored in the EEPROM 33 at that time. The calibration constants can be measured and stored in memory at some later time if desired—for example, after being delivered to a user.

What is claimed is:

1. A tag for use with a plurality of readers of different designs, each reader being operable with associated tags, a reader performing an interrogation by transmitting a carrier, an associated tag responding to an interrogation with an associated-tag message waveform that can be read by the reader, the tag comprising:

a transducer;

a modulator connected across the transducer;

a control means for causing the modulator to drive the transducer with a plurality of different message waveforms after interrogation by a reader, each of the different message waveforms emulating a different associated-tag message waveform, the tag identity being embedded in each of the different message waveforms.

2. The tag of claim 1 wherein the control means causes the modulator to drive the transducer with a plurality of different message waveforms after interrogation and while the carrier is present, the control means causing the modulator to drive the transducer with one or more different message waveforms after interrogation and while the carrier is absent, the tag identity being embedded in each of the message waveforms.

3. The tag of claim 1 wherein a message waveform is comprised of a sequence of contiguous waveform segments, each waveform segment representing the value of an N-bit group, N being an integer, the waveform segments used to represent the values of an N1-bit group in one message waveform being different from those used to represent an N2-bit group in another message waveform, N1 and N2 being the same or different.

4. The tag of claim 3 wherein a waveform segment is a periodic signal characterized by the parameters frequency, phase, and amplitude, the waveform segments used to represent the values of an N-bit group for a message waveform being differentiated by the values of one or more parameters.

5. The tag of claim 1 wherein the control means causes the modulator to drive the transducer simultaneously with a plurality of message waveforms.

6. The tag of claim 1 wherein the control means causes the modulator to drive the transducer sequentially with a plurality of message waveforms.

7. The tag of claim 1 further comprising:

an alerting circuit connected across the transducer, the alerting circuit generating an alerting signal having a first value prior to an interrogation, the alerting signal changing from the first value to a second value when the reader carrier becomes greater than a first predetermined magnitude, the alerting signal changing from the second value to the first value when the reader carrier falls below a second predetermined magnitude, the first predetermined magnitude being greater than the second predetermined magnitude, the control means causing the modulator to drive the transducer with a plurality of different message waveforms after the value of the alerting signal changes from the first value to the second value.

8. The tag of claim 7 wherein the control means causes the modulator to drive the transducer with one or more different message waveforms when the value of the alerting signal changes from the second value to the first value.

9. A tag for use with a plurality of readers, a reader interrogating a tag by transmitting a carrier, the tag comprising:

a transducer;

a modulator comprising a plurality of different driving circuits connected across the transducer, a driving circuit being selected from the group comprising (1) a resistive load, (2) a circuit which injects charge into the transducer, (3) a capacitive load, and (4) an inductive load;

a control means for causing the modulator to drive the transducer with one or more different message waveforms using one of the driving circuits after interrogation by a reader, the tag identity being embedded in each of the message waveforms.

10. The tag of claim 9 wherein at least one of the driving circuits includes a resistive load across the transducer, the magnitude of the resistive load being determined by the message waveform.

11. The tag of claim 9 wherein at least one of the driving circuits injects charge into the transducer, the magnitude of the injected charge being determined by the message waveform.

12. The tag of claim 9 wherein at least one of the driving circuits includes a capacitive load across the transducer, the magnitude of the capacitive load being determined by the message waveform.

13. The tag of claim 9 wherein at least one of the driving circuits includes an inductive load across the transducer, the magnitude of the inductive load being determined by the message waveform.

14. The tag of claim 9 wherein at least one of the driving circuits includes a first load and a second load connected in series across the transducer, the first load being short-circuited for one polarity of the voltage across the transducer, the second load being short-circuited for the other polarity of the voltage across the transducer.

15. The tag of claim 14 wherein the control means causes only one of the loads to be driven.

16. The tag of claim 14 wherein the control means causes the first and second loads to be driven in phase.

17. The tag of claim 14 wherein the control means causes the first and second loads to be driven out of phase.

18. The tag of claim 9 wherein at least one of the driving circuits includes a first charge injector and a second charge injector connected in series across the transducer, the first charge injector being short-circuited for one polarity of the voltage across the transducer, the second charge injector being short-circuited for the other polarity of the voltage across the transducer.

19. The tag of claim 18 wherein the control means causes only one of the charge injectors to be driven.

20. The tag of claim 18 wherein the control means causes the first and second charge injectors to be driven in phase.

21. The tag of claim 18 wherein the control means causes the first and second charge injectors to be driven out of phase.

22. A tag for use with a plurality of readers, a reader interrogating a tag by transmitting a carrier, the tag comprising:
   a transducer;
   a modulator connected across the transducer;
   a control means for causing the modulator to drive the transducer with one or more message waveforms after interrogation by a reader;
   a two-stage power developer connected across the transducer for supplying power to the components comprising the tag, the power developer obtaining power from the voltage induced in the transducer by a reader's carrier, a first portion of the power supplied by the reader's carrier being supplied by the power developer directly to the tag components, a second portion of the power supplied by the reader's carrier being stored by the power developer and supplied to the tag components when the first portion is insufficient to power the tag.

23. A tag for use with a plurality of readers, a reader interrogating a tag by transmitting a carrier, the tag comprising:
   a transducer;
   a modulator connected across the transducer;
   a control means for causing the modulator to drive the transducer with one or more message waveforms after interrogation by a reader, the tag identity being embedded in each of the message waveforms;
   a power developer connected across the transducer and comprising a battery for supplying power to the components comprising a tag, the power developer recharging the battery with power from the voltage induced in the transducer by a reader's carrier.

24. A method for responding to interrogations by a plurality of readers of different designs, each reader being operable with associated tags, a reader interrogation being accomplished by the transmission of a carrier, an associated tag responding to an interrogation with an associated-tag message waveform that can be read by the reader, the method comprising the steps:
   transmitting a plurality of different message waveforms after interrogation by a reader, each of the different message waveforms emulating a different associated-tag message waveform, the tag identity being embedded in each of the different message waveforms.

25. The method of claim 24 further comprising the step:
   transmitting a plurality of different message waveforms after interrogation and while the carrier is present, the tag identity being embedded in each of the message waveforms;
   transmitting one or more different message waveforms after interrogation and while the carrier is absent, the tag identity being embedded in each of the message waveforms.

26. The method of claim 24 wherein a message waveform is comprised of a sequence of contiguous waveform segments, each waveform segment representing the value of an N-bit group, N being an integer, the waveform segments used to represent the values of an N1-bit group in one message waveform being different from those used to represent an N2-bit group in another message waveform, N1 and N2 being the same or different.

27. Apparatus for practicing the method of claim 24.

28. The method of claim 24 wherein a plurality of message waveforms are generated simultaneously.

29. The method of claim 24 wherein a plurality of message waveforms are generated sequentially.

30. A method for responding to interrogations by a plurality of readers, a reader interrogation being accomplished by the transmission of a carrier, the method comprising the steps:
   transmitting one or more message waveforms after interrogation by a reader, the tag identity being embedded in each of the message waveforms;
   obtaining power from a reader's transmission of a carrier to perform the transmitting step, a first portion of the power being used directly to perform the steps, a second portion of the power being stored and used to perform the steps when the first source of power is insufficient.

31. Apparatus from practicing the method of claim 30.

32. A method for responding to interrogations by a plurality of readers, a reader interrogation being accomplished by the transmission of a carrier, the method comprising the steps:
   transmitting one or more message waveforms after interrogation by a reader, the tag identity being embedded in each of the message waveforms;
   obtaining power from a battery to perform the transmitting step, recharging the battery with power obtained from a reader's transmission of a carrier.

33. Apparatus for practicing the method of claim 32.

34. A method for responding to interrogations by a plurality of readers, a reader interrogation being accomplished by the transmission of a carrier, the method comprising the steps:

determining whether a reader carrier is unmodulated or modulated with data;

extracting the data from a modulated reader carrier;

executing one or more commands contained in the extracted data.

35. The method of claim 34 further comprising the step:

transmitting one or more message waveforms after interrogation by a reader, the tag identity being embedded in each of the message waveforms, a predetermined one or more message waveforms being transmitted if the reader carrier is unmodulated, one or more message waveforms specified by the extracted data being transmitted if the command to transmit one or more message waveforms specified by the extracted data is contained in the extracted data.

36. The method of claim 35 wherein the transmitting step is performed in accordance with a procedure specified by the extracted data if the command to perform the transmitting step in accordance with a procedure specified by the extracted data is contained in the extracted data.

37. Apparatus for practicing the method of claim 34.

38. A tag for use with a plurality of readers, a reader interrogating a tag by transmitting a carrier, the tag comprising:

a transducer;

a modulator connected across the transducer;

a control means for causing the modulator to drive the transducer with one or more message waveforms after interrogation by a reader;

a two-stage power developer connected across the transducer for supplying power to the components comprising the tag, the power developer being selected from the group consisting of (1) a power developer which obtains power from the voltage induced in the transducer by a reader's carrier, a first portion of the power supplied by the reader's carrier being supplied by the power developer directly to the tag components, a second portion of the power supplied by the reader's carrier being stored by the power developer and supplied to the tag components when the first portion is insufficient to power the tag and (2) a power developer comprising a battery for supplying power to the components comprising a tag, the power developer recharging the battery with power from the voltage induced in the transducer by a reader's carrier.

39. A method for responding to interrogations by a plurality of readers, a reader interrogation being accomplished by the transmission of a carrier, the method comprising the steps:

transmitting one or more message waveforms after interrogation by a reader, the tag identity being embedded in each of the message waveforms;

obtaining power to perform the transmitting step by performing a step selected from the group consisting of (1) obtaining power from a reader's transmission of a carrier, a first portion of the power being used directly to perform the steps, a second portion of the power being stored and used to perform the steps when the first source of power is insufficient and (2) obtaining power from a battery and recharging the battery with power obtained from a reader's transmission of a carrier.

40. The method of claim 26 wherein a waceform segment is a periodic signal characterized by the parameters frequency, phase, and amplitude, the waveform segments used to represent the values of an N-bit group for a message waveform being differentiated by the values of one or more parameters.

* * * * *